Figures 1, 2, 3:
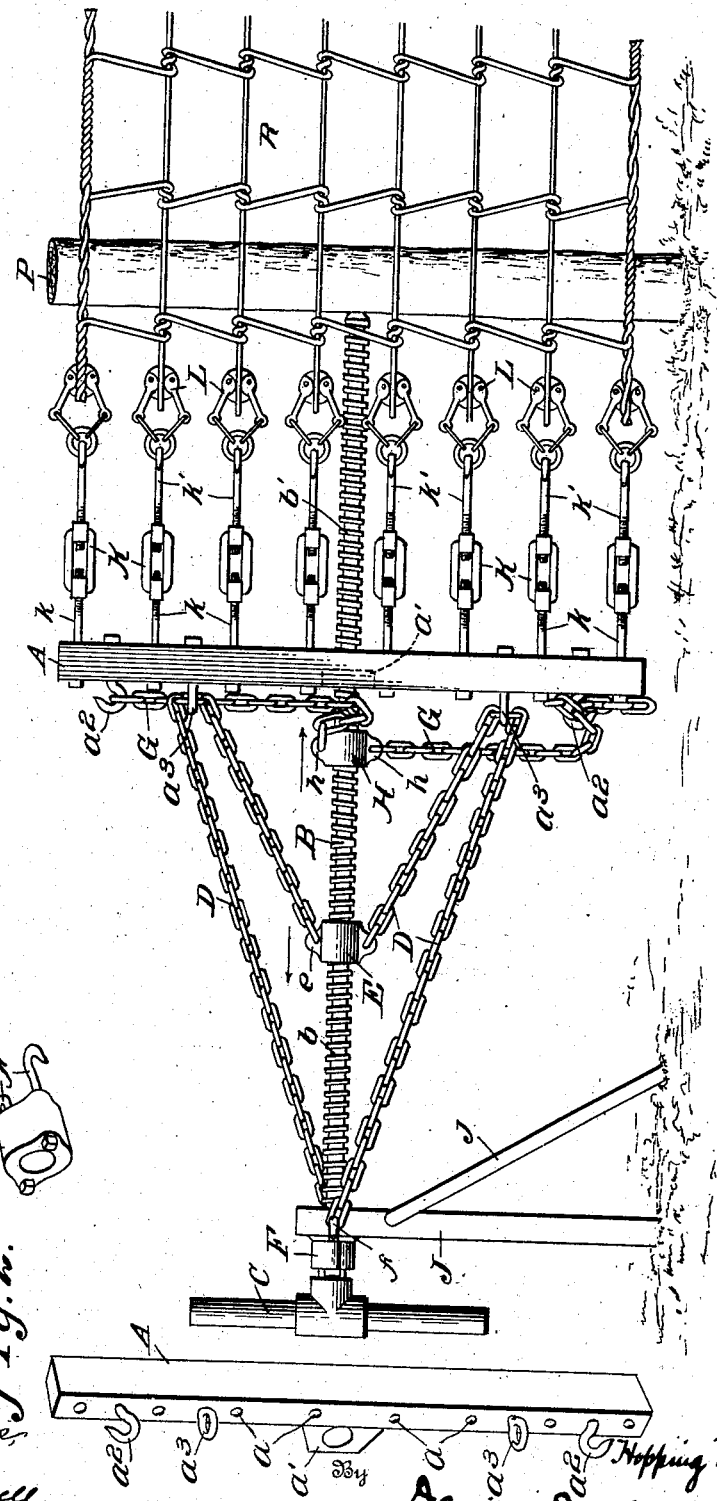

No. 827,257.

PATENTED JULY 31, 1906.

H. MURRELL.
FENCE WIRE STRETCHER.
APPLICATION FILED MAR. 28, 1906.

Witnesses
L. B. Bridges
Edwin L. Yewell

Inventor
Hopping Murrell

By Davis & Davis,
Attorneys.

THE NORRIS PETERS CO., WASHINGTON, D. C.

UNITED STATES PATENT OFFICE.

HOPPING MURRELL, OF HOPE HULL, ALABAMA.

FENCE-WIRE STRETCHER.

No. 827,257.  Specification of Letters Patent.  Patented July 31, 1906.

Application filed March 28, 1906. Serial No. 308,559.

*To all whom it may concern:*

Be it known that I, HOPPING MURRELL, a citizen of the United States of America, and a resident of Hope Hull, county of Montgomery, State of Alabama, have invented certain new and useful Improvements in Fence-Wire Stretchers, of which the following is a full and clear specification, reference being had to the accompanying drawings, in which—

Figure 1 is a side elevation of a wire fence, showing the attachment thereto of my apparatus; Fig. 2, a perspective view in detail of the stretching bar or post; and Fig. 3, a detail perspective view of a loose collar F, mounted on the screw.

The object of this invention is to provide a simple and inexpensive apparatus for tightening all the wires at one operation, means being not only provided for independently tightening the wires, but also for tightening all the wires simultaneously, as more fully hereinafter set forth.

To the accomplishment of this object and such others as may hereinafter appear the invention consists of the parts and combination of parts hereinafter fully described, and particularly pointed out in the appended claims, reference being had to the accompanying drawings, forming a part of this specification, in which the same reference characters designate like parts throughout the several views.

In the drawings, A designates a stretcher bar or post carrying a laterally-projecting rigid block $a'$ about midway its ends. Through a horizontal hole in this block a screw B loosely passes, the outer end of this screw being provided with a handle C, whereby the screw may be turned. This handle may slide in the head of the screw, if desired, in order that the leverage may be increased.

A series of independent stretchers are attached to the bar A, each stretcher consisting desirably of a threaded rod $k$, passed through the stretcher-bar, a turnbuckle K, screwed on the forward end thereof, another threaded rod $k'$, screwed into the turnbuckle and having a loose ring at its forward end, which connects it with a wire-clamp L of any suitable type.

The screw is a double screw having half its threads right and the other half left, the two kinds of threads meeting about midway of the length of the screw, thereby forming substantially two screws $b$ and $b'$. The nut E is mounted on one of the screws, and a similar nut H is mounted on the other screw. The nut H is provided with oppositely-extending ears $h$, to which are permanently connected the inner ends of chains G, the outer or free ends of these chains G being adapted to be linked into open hooks $a^2$, attached to the stretcher-bar near the ends thereof. The nut E is also provided with oppositely-extending ears $e$, and to these ears are connected the respective inner ends of another pair of chains D, which chains are carried forward and passed through eyes $a^3$, carried by the stretcher-bar at points near the respective hooks $a^2$. From these eyes the chains extend forwardly, and their forward ends are detachably linked over open hooks $f$, projecting rearwardly from a collar F, mounted loosely upon the screw near the head thereof, this collar being prevented from sliding forwardly on the screw by means of a suitable stop or flange on the screw.

In using this apparatus the forward end of the screw is put against one of the fence-posts and the rear end of the screw is supported on a suitable frame supported on the ground. In the present instance I have shown this support to consist of a post J and one or more braces $j$; but it is obvious that any suitable support may be employed. The stretcher-bar A is then raised to an upright position, and the wire-clamps L are connected to the respective longitudinal wires of the fence. Then either the chain G or the chain D is drawn taut and engaged with its hooks, the other chain being allowed to remain loose. In the drawings the chain D is shown taut. Then when the screw is rotated to the right the nut E will be drawn rearward, thus pulling the stretcher-bar rearward and tightening all the wires. At the same time the nut H will travel forwardly, thus slacking its chain. Then if further stretching is desired the chains G are tightened (by detaching their free ends from the hooks $a^2$ and engaging links of the chains nearer the nut H) and the screw is rotated in the opposite direction, thereby drawing rearwardly the nut H, and thus further tightening the wires. When nut H is drawn rearwardly, the nut E is of course moved forwardly, thus slacking chains D. This alternative operation is repeated until the wires are drawn sufficiently taut. It will be observed that by this arrangement the slack of a great length of fencing may be taken up and the wires held until they are stapled to the post. Should any of the wires have more slackness than the others, it is obvious that they may be individually tightened by means of the turnbuckle connections K, so that when the wires are stapled to the posts they will have approximately the same degree of tautness.

It will be apparent to those skilled in the art that various mechanical embodiments of the invention are possible, and I therefore do not wish to be limited to the exact arrangement and construction shown.

What I claim, and desire to secure by Letters Patent, is—

1. In a device of the character set forth, the combination of a stretcher-bar adapted to be held in a vertical position, a series of independently-operable wire-tighteners connected thereto each being provided with means for engagement with one of the wires of the fence, a screw adapted to engage a fence-post at one end, means for supporting the other end of the screw, a pair of nuts on the screw adapted to travel simultaneously in opposite directions thereon when the screw is turned, and chain connections between each nut and the stretcher-bar, for the purposes set forth.

2. In combination with a stretcher-bar carrying means for engagement with the longitudinal wires of the fence, of a screw and means for supporting it, a pair of nuts adapted to simultaneously travel in opposite directions on the screw when the screw is turned, a pair of chains connecting each nut to the stretcher-bar near the outer ends thereof, substantially as set forth.

In testimony whereof I hereunto affix my signature, in the presence of two witnesses, this 24th day of March, 1906.

HOPPING MURRELL.

Witnesses:
  C. L. CHILTO, Jr.,
  J. H. WASHBURN.